United States Patent [19]

Pouillange

[11] 4,281,375
[45] Jul. 28, 1981

[54] STATIC FREQUENCY CONVERTER

[75] Inventor: Jean-Paul Pouillange, Aulnay-sous-Bois, France

[73] Assignee: BBC Brown, Boveri & Company, Ltd., Baden, Switzerland

[21] Appl. No.: 112,236

[22] Filed: Jan. 15, 1980

[30] Foreign Application Priority Data

Jan. 29, 1979 [FR] France ................. 79 02174

[51] Int. Cl.³ ............................ H02M 5/27
[52] U.S. Cl. ..................... 363/37; 363/141; 363/160
[58] Field of Search ............. 363/1, 2, 8, 9, 34, 363/37, 141, 144, 160–162, 177

[56] References Cited

U.S. PATENT DOCUMENTS 3,742,336  6/1973  Bedford ................. 363/8 X

Primary Examiner—A. D. Pellinen

Attorney, Agent, or Firm—Oblon, Fisher, Spivak, McClelland & Maier

[57] ABSTRACT

A natural commutation static frequency converter including a polyphase cycloconverter and its control circuit, a switching device enabling breaking of inputs of two Graetz bridges of at least one of monophase cycloconverters, as well as breaking of outputs of the bridges which are not connected to neutral point. The switching device results in insertion of a self-inductance between opened outputs of the Graetz bridges, and replacement of the control circuit of cycloconverter with a natural commutation rectifier-inverter control circuit, so as to form at least one natural commutation rectifier-inverter. The switching device further enables replacement of the outputs of the polyphase cycloconverter with the outputs of at least one rectifier-inverter so formed. The converter may be used to supply a synchronous motor.

8 Claims, 8 Drawing Figures

STATIC FREQUENCY CONVERTER

BACKGROUND OF THE INVENTION

1. Field of the Invention

The present invention concerns a natural commutation static frequency converter intended to supply a synchronous motor, and more particularly a converter of the type comprising a polyphase cycloconverter with control circuit, including n monophase cycloconverters each having two reversed Graetz bridges of which the inputs are interconnected as well as the outputs, one of the outputs of each cycloconverter being connected to a neutral point.

2. Discussion of the Prior Art

Natural commutation static frequency converters have the advantage, as their name indicates, of not using forced commutation circuits, which complicate and weigh down the converter, for extinction of thier controlled semiconductor elements (e.g. thyristors). Reversal of the voltage at the terminals of the thyristors induces extinction. For these extinction conditions to be present, it is necessary, for example, that the motor supplied by the converter have a forward cos $\psi$ (the current phase is advanced with regard to the voltage phase) and sufficient voltage.

There exist two principal types of static frequency converters, i.e. rectifier-inverters and cycloconverters.

A three-phase natural commutation rectifier-inverter supplying a synchronous motor is perfectly satisfactory when the speed of the motor is high enough, but natural commutation does not occur at low speeds due to the lack of voltage. It is then necessary momentarily to cut the inverter current with the rectifier when the combination of thyristors crossed by the current at the inverter must be changed. The result is a time-scalloped couple having a lower average value where the maximal couple is generally required.

By contrast, a cycloconverter functions properly at low speeds of the motor but requires an input frequency two or three times higher than the frequency of the motor. This constraint may become troublesome, indeed even fatal, if the frequency of the motor is high.

SUMMARY OF THE INVENTION

Accordingly, it is the object of the present invention to provide a static frequency converter of the type indicated above which has the advantages of rectifier-inverters and cycloconverters without the drawbacks of either.

To this end, the static frequency converter of the present invention further includes at least one self-inductance, at least one natural commutation rectifier-inverter control circuit, and a switching device enabling (i) opening of the inputs of the two Graetz bridges of at least one of the monophase cycloconverters as well as the outputs of the Graetz bridges which are not connected to the neutral point, (ii) insertion of the self-inductance between the opened outputs of the Graetz bridges, and (iii) replacement of the cycloconverter control circuit by the natural commutation rectifier-inverter control circuit, so as to form at least one natural commutation rectifier-inverter. The switching device further enables replacement of the polyphase cycloconverter outputs with those of at least one rectifier-inverter so formed.

With such an arrangement, it becomes possible to operate the static frequency converter as a cycloconverter for low speeds of the synchronous motor and as a rectifier-inverter for higher motor speeds.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
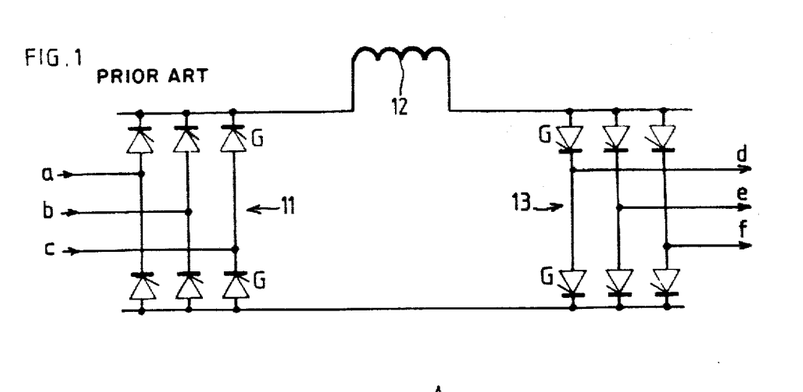
FIG. 1 is a schematic diagram of a known rectifier-inverter.

Referring now to the drawings, wherein like reference numerals designate identical or corresponding parts throughout the several views, and more particularly to FIG. 1 thereof, the known natural commutation rectifier-inverter includes three inputs a, b and c connected to a three-phase network (not shown) and feeding Graetz bridge-rectifier 11. The rectified current is filtered by self-inductance 12 and sent to Graetz bridge-inverter 13, of which the outputs d, e and f are connected to a three-phase synchronous motor (not shown). A control circuit (not shown) is connected to gates G of the controlled semiconductor elements (e.g. thyristors) of the two Graetz bridges 11 and 13 to control start-up in a known fashion.

Figure 2:
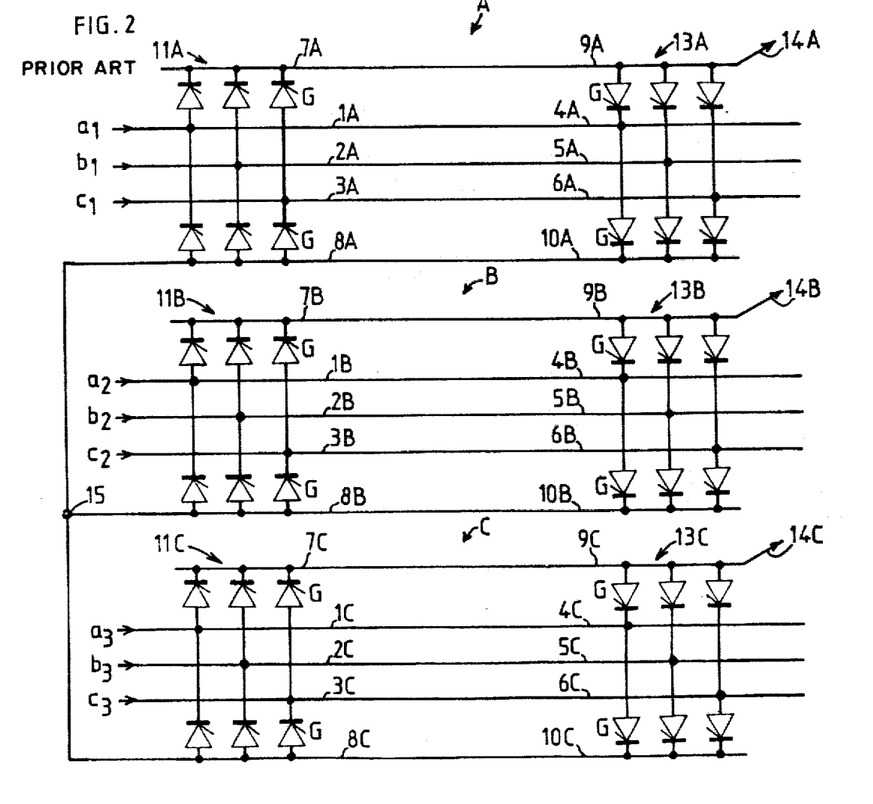
FIG. 2 is a schematic diagram of a known cycloconverter.

FIG. 2 represents a three-phase cycloconverter comprising three monophase cycloconverters A, B and C supplied by three independent three-phase networks ($a_1$, $b_1$, $c_1$), ($a_2$, $b_2$, $c_2$), and ($a_3$, $b_3$, $c_3$) respectively. Each monophase cycloconverter A, B and C comprises two Graetz bridges 11A and 13A, 11B and 13B, and 11C and 13C, respectively.

The controlled semiconductor elements of Graetz bridge 11A are mounted inversely to those of Graetz bridge 13A. Inputs 1A, 2A and 3A of bridge 11A are connected respectively to inputs 4A, 5A, and 6A of bridge 13A. Similarly, outputs 7A and 8A of bridge 11A are connected respectively to outputs 9A and 10A of bridge 13A. Outputs 7A and 9A form a first output 14A of monophase cycloconverter A, while outpus 8A and 10A form the second output of cycloconverter A, connected to a neutral point 15 which is common to the three monophase cycloconverters A, B and C.

The elements of the other two monophase cycloconverters B and C which are comparable to those of monophase cycloconverter A are designated by the same reference numbers together with the letters B and C respectively, and are connected in the same way. A polyphase cycloconverter control circuit (not shown) is connected to gates G of the controlled semiconductor elements (e.g. thyristors) of each of the three monophase cycloconverters A, B and C so as to induce their start-up in such a way as to provide an equilibrated three-phase voltage across outputs 14A, 14B and 14C.

Figure 3:
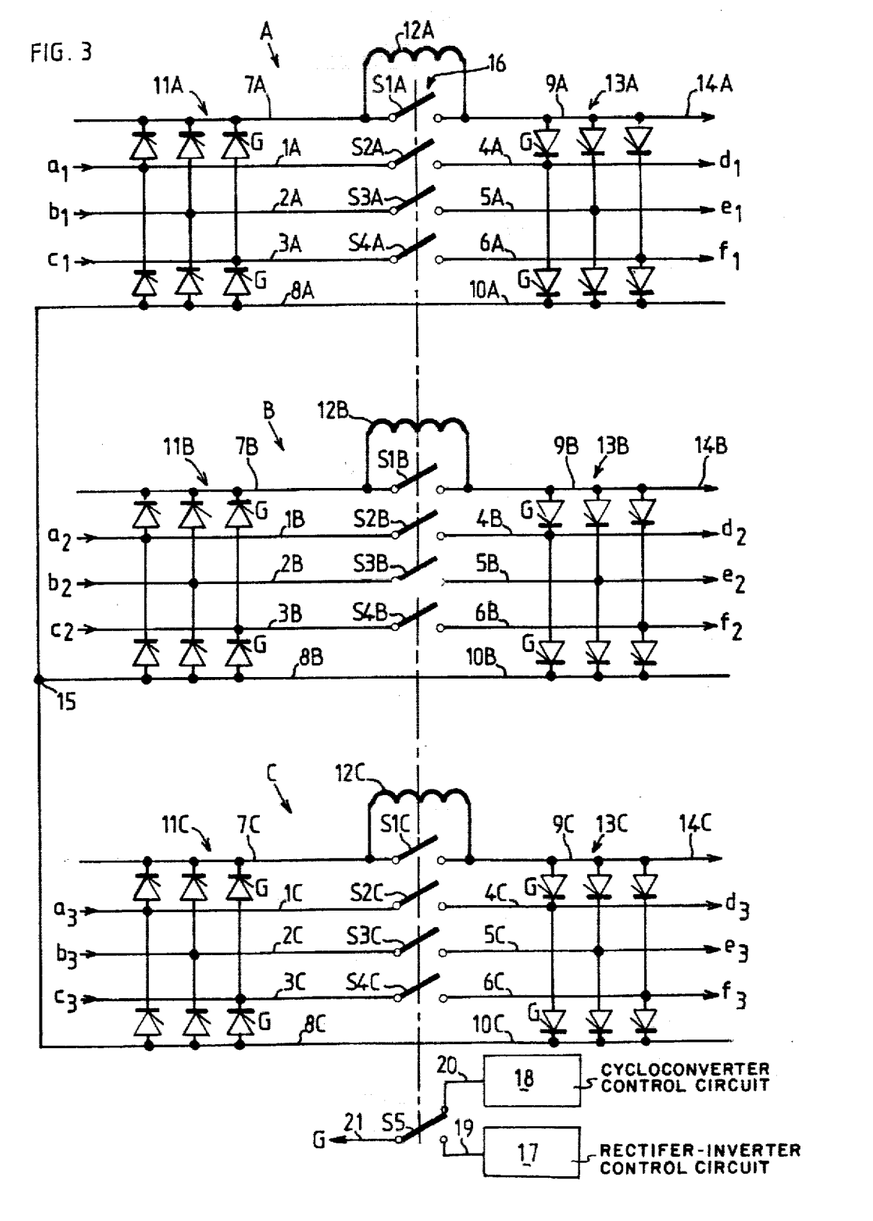
FIG. 3 is a schematic diagram illustrating the wiring pinciple of the static frequency converter of the invention.

FIG. 3 represents a natural commutation static frequency converter according to the present invention. It comprises a three-phase cycloconverter analogous to that represented in FIG. 2 (comparable elements are designated by the same reference numbers) but completed by a switching device 16 comprising several switches S1A to S4A, S1B to S4B, S1C to S4C, and S5, which are all coupled together mechanically. Switches S2, S3 and S4 enable opening respectively of inputs 1 and 4, 2 and 5, and 3 and 6 of the two Graetz bridges 11 and 13 of each monophase cycloconverter. Each switch S1 enables opening of outputs 7 and 9 of the two Graetz bridges 11 and 13 of each monophase cycloconverter and insertion between opened outputs 7 and 9 of a self-inductance designated by reference number 12 together with the letter A, B or C according to the monophase cycloconverter involved. Switch S5 enables replacement of the natural commutation cycloconverter control circuit 17 with at least one natural commutation rectifier-inverter control circuit 18. Although only switch S5 is represented in FIG. 3 and although conducting lines 19, 20 and 21 are represented in unifilar form, it is understood that lines 19, 20 and 21 in reality are implemented by an appropriate number of elementary conductors and that a corresponding number of switches S5 must be provided to control thyristor gates G in known fashion.

When switches S1A to S4A, S1B to S4B, and S1C to S4C are closed and switch S5 is making a connection between lines 19 and 21, one obtains a three-phase cycloconverter, the outputs of which are designated by reference numbers 14A, 14B and 14C. In contrast, when switches S1A to S4A, S1B to S4B, and S1C to S4C are open and switch S5 is making contact between lines 20 and 21, one obtains three three-phase rectifier-inverters, the outputs of which are respectively, $d_1$, $e_1$, $f_1$; $d_2$, $e_2$, $f_2$; and $d_3$, $e_3$ and $f_3$. Any one, two or three of these rectifier-inverters may be used. Of course, in order to be able to connect the charge (e.g., a three-phase synchronous motor), either to the three outputs 14A, 14B and 14C of the three-phase cycloconverter, or to the three outputs d, e and f of a single rectifier-inverter, or any two of the latter, or of all three of them, switching device 16 comprises other switches (not shown in FIG. 3) enabling selective attainment of the desired connections. For example, additional switches may be arranged so as to replace outputs 14A, 14B and 14C respectively with outputs $d_1$, $e_1$ and $f_1$, or respectively by outputs $d_1$ and $d_2$ connected in parallel, $e_1$ and $e_2$ connected in parallel, and $f_1$ and $f_2$ connected in parallel, or respectively by outputs $d_1$, $d_2$ and $d_3$ connected in parallel, $e_1$, $e_2$ and $e_3$ connected in parallel, and $f_1$, $f_2$ and $f_3$ connected in parallel.

Since the pertinent combinations are many, the additional switches of the switching device relating to outputs have not been shown in FIG. 3.

The power of a three-phase rectifier-inverter is comparable to that of a three-phase cycloconverter using thyristors having the same nominal power as those used to form the rectifier-inverter. If it is desired that the static frequency converter according to the invention be able, when functioning as a rectifier-inverter, to provide the charge (synchronous motor) with greater power than when it is operating as a cycloconverter, it suffices to connect in parallel the outputs of two or fewer of the three rectifier-inverters formed from the three monophase cycloconverters. Among the three rectifier-inverters there exist three possible combinations of two rectifier-inverters. The possibility of having three pairs of rectifier-inverters thus makes for a redundancy of the highest value in case one of the rectifier-inverters fails; whence the importance of a multipoint switch enabling selective 2 by 2 connection of the outputs of any two of the three rectifier-inverters so as to make up the three possible combinations while at the same time enabling the three-phase cycloconverter to be attained.

Figure 4:
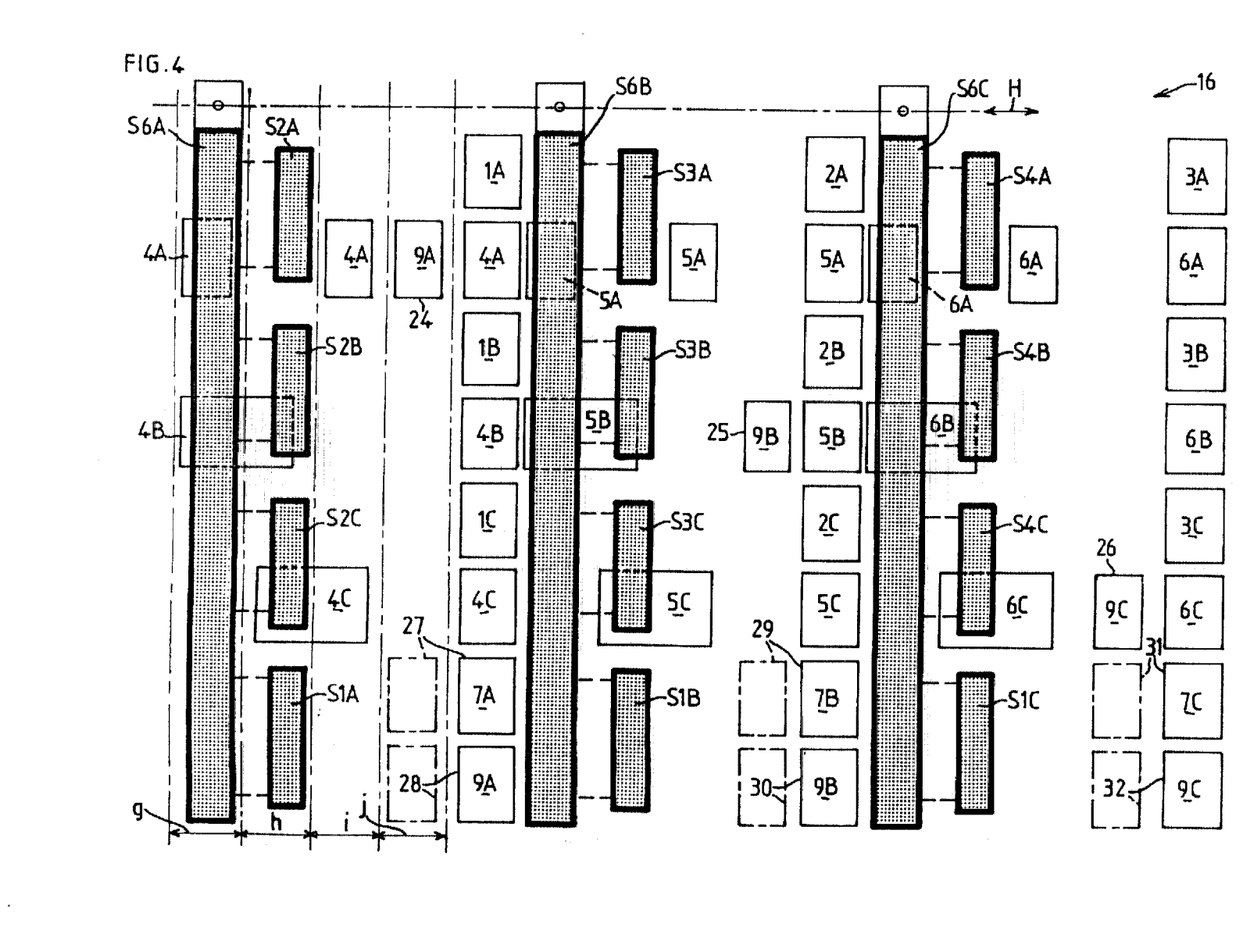
FIG. 4 is a schematic diagram of a multipoint switch useful for construction of the static frequency converter of the invention.

The schematic diagram of such a multipoint switch is represented in FIG. 4. The switchings enabling movement from the three-phase cycloconverter to any one of the three pairs of rectifier-inverters or from one to another pair of rectifier-inverters may be carried out without charge by momentary extinction of the thyristors. One may also put to use a simple brush-equipped multipoint switch which slides over conductive contact pads connected galvanically to the conductors to which the thyristors of Graetz bridges 11 and 13 are connected electrically. In FIG. 4, the conductive contact pads are 4A, 4B, 4C, 9A, 1A, 4A, 1B, 4B, 1C, 4C, 7A, 9A, 5A, 5C, 9B, 2A, 5A, 2B, 9B, 5B, 2C, 5C, 7B, 9B, 6A, 6C, 9C, 3A, 6A, 3B, 6B, 3C, 6C, 7C, and 9C, while the sliding brushes are S6A, S2A, S2B, S2C, S1A, S6B, S3A, S3B, S3C, S1B, S6C, S4A, S4B, S4C, and S1C. In the interest of simplicity, the conductive contact pads are designated by the same reference symbols as the conductors represented in FIG. 3, to which they are connected galvanically.

As shown in FIG. 4, three large sliding brushes S6A, S6B and S6C are provided, i.e., one per output phase making up the three outputs of the static frequency converter. The three brushes S6A to S6C are insulated electrically from each other but are coupled mechanically as so to be able to move simultaneously in the direction of double arrow H. To each of the three large brushes S6A to S6C are joined four small brushes which are coupled mechanically to the corresponding large brush so as to move with it. The twelve small brushes so provided correspond to switches S1A to S4A, S1B to S4B, and S1C to S4C of FIG. 3 and are designated by the same reference symbols. The switches of FIG. 3, with the exception of switch S5, are naturally open by construction.

In position g, brush S6A electrically connects conductive pads 4A and 4B (outputs $d_1$ and $d_2$ of FIG. 3), brush S6B electrically connects conductive pads 5A and 5B (outputs $e_1$ and $e_2$ of FIG. 3) and brush S6C electrically connects conductive pads 6A and 6B (outputs $f_1$ and $f_2$ of FIG. 3). The pair of rectifier-inverters A+B is thus obtained. In position h, the rectifier-inverter pair B+C will be obtained. In the same way, in position i the rectifier-inverter pair A+C will be obtained. Finally, in position j brushes S6A, S6B and S6C are respectively in contact with conductive pads 9A, 9B and 9C (outputs 14A, 14B and 14C of FIG. 3) and the twelve small brushes S2A, S2B, S2C, S1A, S3A, S3B, S3C, S1B, S4A, S4B, S4C and S1C set up conductive connections between conductive pads 1A and 4A, 1B and 4B, 1C and 4C, 7A and 9A, 2A and 5A, 2B and 5B, 2C and 5C, 7B and 9B, 3A and 6A, 3B and 6B, 3C and 6C, and 7C and 9C, thus forming the switches of FIG. 3. A three-phase cycloconverter is thus obtained.

With reference to FIGS. 5 through 8, a particularly compact embodiment of a static frequency converter according to the invention will now be described incorporating the multipoint switch of FIG. 4.

Figure 5:
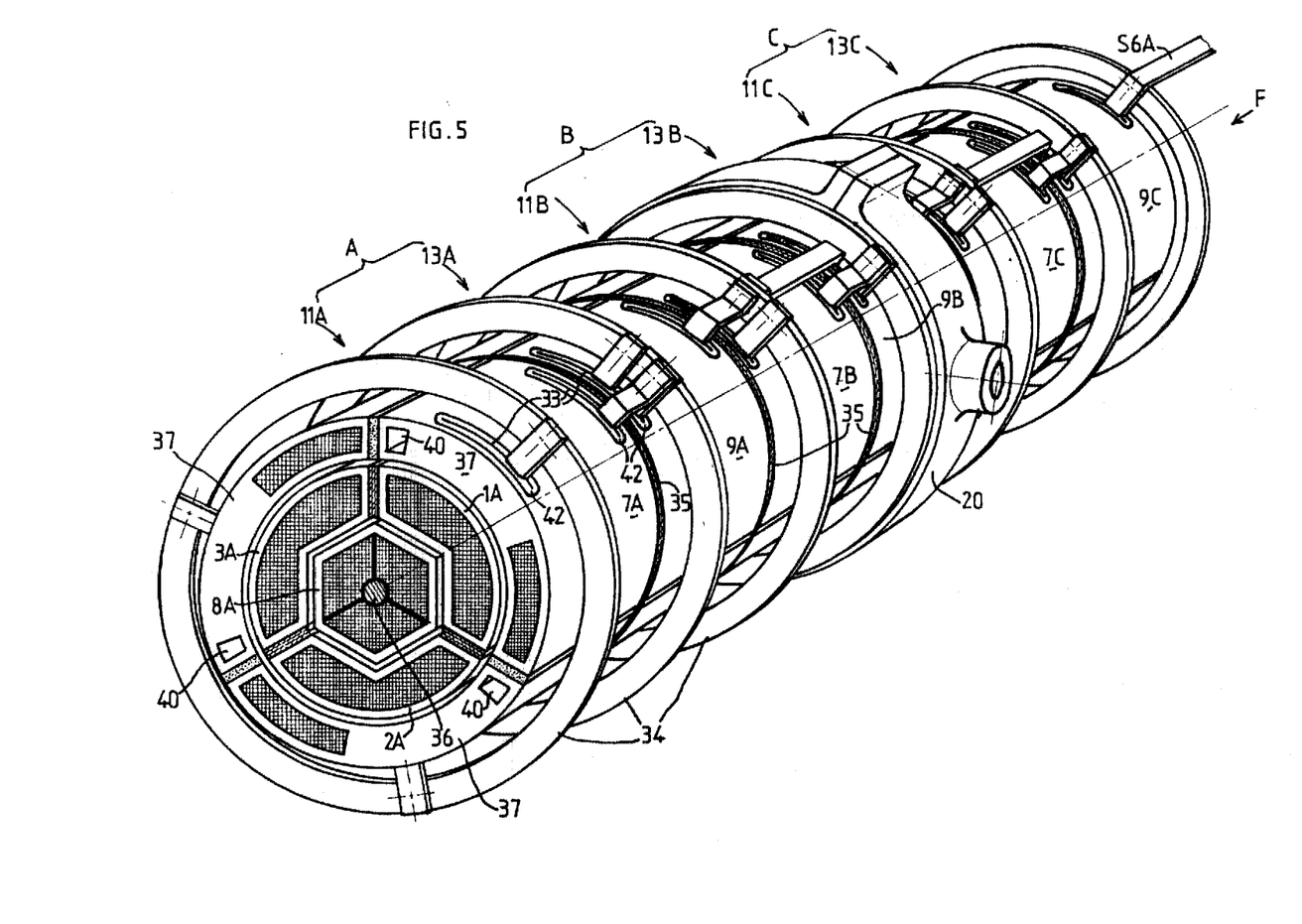
FIG. 5 is a perspective view showing a concrete embodiment of the static frequency converter of the invention.
Figure 6:
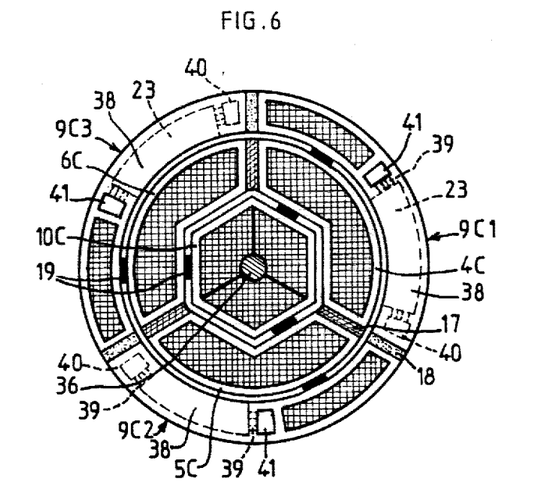
FIG. 6 is an end view of the converter along arrow F of FIG. 5, with certain details not shown.
Figure 7:
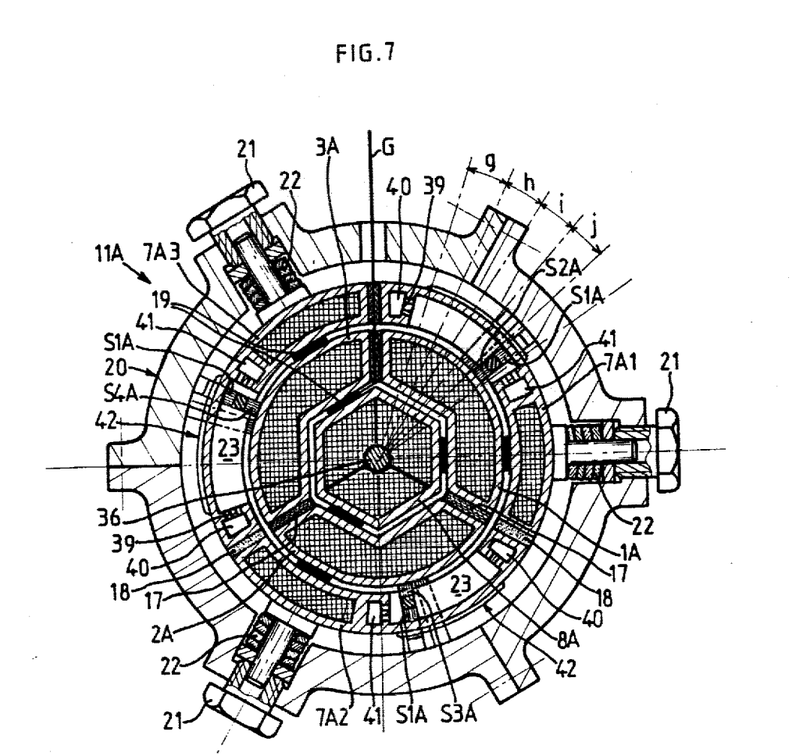
FIG. 7 is a cross-sectional view of the first cell of the converter of FIG. 5.

As shown in FIG. 5, the static frequency converter comprises a series of six essentially cylindrical cells aligned axially and corresponding to the six Graetz bridges 11A, 13A, 11B, 13B, 11C and 13C of FIG. 3. The six cells all have the same structure. For example, as shown in FIGS. 5 and 7, the cell corresponding to Graetz bridge 11A comprises several multitubular hollow elements of a conducting material, i.e., a central hollow element 8A having hexagonal section which corresponds to conductor 8A of FIG. 3, three hollow elements 1A, 2A and 3A which correspond to the three conductors designated by the same reference symbols in FIG. 3 and which are insulated from each other by three insulating plates 17 and disposed circumferentially so as to form a first ring around central hollow element 8A, and three other hollow elements 7A1, 7A2 and 7A3, which are separated by three plates 18 and disposed circumferentially so as to form a second ring around the first ring. The three outer elements 7A1, 7A2 and 7A3 are electrically interconnected by a non-represented electrical connection so as to form conductor 7A of FIG. 3. The interior spaces of hollow conductor elements 8A, 1A, 2A, 7A1, 7A2 and 7A3 are subdivided by several internal partitions, e.g., radial and circumferential, which form between them a multitude of small channels extending in the axial direction of the cell through which may flow a cooling fluid. The six thyristors 19 of Graetz bridge 11A are disposed, as FIG. 7 shows, in the spaces between central element 8A and the first ring formed by hollow elements 1A, 2A and 3A, and between this first ring and the second ring formed by hollow elements 7A1, 7A2, and 7A3. The conductors of gate G of thyristors 19 are brought out toward the outside through radial passages fashioned in plates 17 and 18. Thyristors 19 are of the pressure contact type. A clamping band 20 (only one of which has been shown in FIG. 5) ensures the cohesion of the hollow conductor elements of each cell as well as the electrical contact by pressure between thyristors 19 and the associated hollow conductor elements. As shown in FIG. 7, each band 20 is provided with three radial tightening screws 21 which enable application, through calibrated springs, e.g., cup washer 22, of the force necessary for good electrical contact between thyristors 19 and the associated hollow conductor elements. The six thyristors 19 are grouped into three pairs, with each pair being aligned with the axis of a screw 21 in such a way that the extreme contact surfaces of the two thyristors of each pair are perpendicular to the axis of screw 21. If all of the elements of clamping band 20 are made of conductive material, the band may also serve to ensure the electrical connection between the outer hollow conductor elements, such as elements 7A1, 7A2 and 7A3 of FIG. 7.

A chamber 23 is formed in a part of each of the three outer hollow conductor elements 7A1, 7A2 and 7A3. Chambers 23 are open toward the inside in the direction of the outer surface of hollow conductor elements 1A, 2A and 3A respectively. As shown in FIG. 7, each chamber 23 contains a double brush constituted by two brushes, inner and outer, electrically insulated from one another and disposed back to back so as to be in sliding contact, one with the outer surface of hollow conductor element 1A, 2A or 3A, and the other with the inner surface of hollow conductor element 7A1, 7A2 or 7A3. The outer brushes form the part of brush S1A of FIG. 4 which is intended to make contact with conductive pad 7A, while the inner brushes form the parts of brushes S2A, S3A and S4A of FIG. 4 that are intended to make contact with conductive pads 1A, 2A and 3A, respectively.

Figure 8:
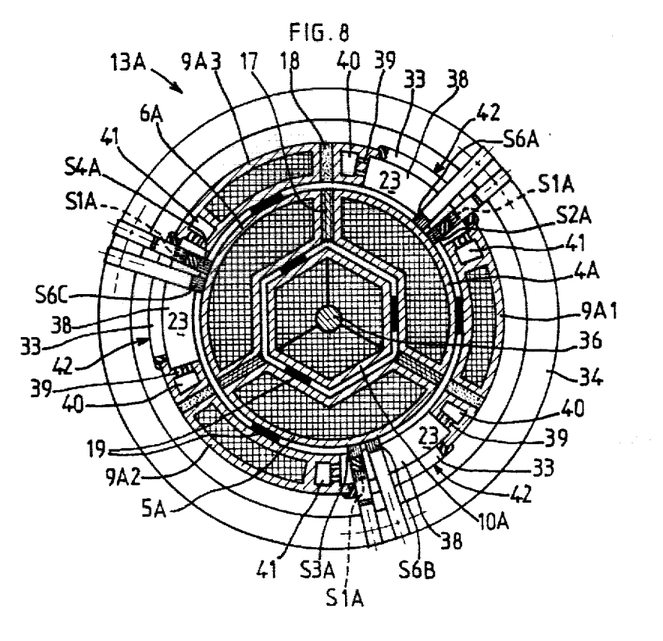
FIG. 8 is a cross-sectional view of the second cell of the converter of FIG. 5, with certain details not shown.

FIG. 8 shows, in cross-section, the cell corresponding to Graetz bridge 13A of FIG. 3. As may be observed, this cell has a structure similar to that of the cell corresponding to Graetz bridge 11A which is represented in FIG. 7. However, clamping band 20 has not been represented in FIG. 8. In this Figure, the central hollow conductor element corresponds to conductor 10A of FIG. 3, the three hollow conductor elements forming the first ring correspond respectively to conductors 4A, 5A and 6A of FIG. 3, and the three outer hollow conductor elements 9A1, 9A2 and 9A3 form the second ring corresponding to conductor 9A of FIG. 3. Each chamber 23 contains a double brush similar to those of FIG. 7, as well as a single brush which makes sliding contact solely with the outer surface of hollow conductor element 4A, 5A or 6A. The outer brushes of the three double brushes form the remaining part of brush S1A of FIG. 4 which is intended to make contact with conductive pad 9A and they are connected electrically to the outer brushes of the three double brushes of FIG. 7. It will be noted that there exists a redundancy of outer brushes for forming brush S1A of FIG. 4. As a matter of fact, it is enough to provide one outer brush alone in one of the three chambers 23 of FIG. 7 and one outer brush alone in one of the three chambers 23 of FIG. 8. The inner brushes of the three double brushes of FIG. 8 form the remaining parts of brushes S2A, S3A and S4A of FIG. 4, which are intended to make contact respectively with conductive pads 4A, 5A and 6A, and they are connected electrically to the inner brushes, designated by the same reference symbols, of the three double brushes of FIG. 7. The three single brushes form the parts of the three large brushes S6A, S6B and S6C of FIG. 4, which are intended to make contact respectively with conductive pads 4A, 5A and 6A.

The cells corresponding to Graetz bridges 11B and 11C have exactly the same structure as the cell of Graetz bridge 11A shown in FIG. 7, with the single difference that the reference symbols with the letter A should have the letter B or C instead, according to whether they refer to Graetz bridge 11B or 11C. Similarly, the cells corresponding to Graetz bridges 13B and 13C have exactly the same structure as the cell of Graetz bridge 13A shown in FIG. 8, with the single difference that the reference symbols with the letter A should have the letter B or C instead, according to whether they refer to Graetz bridge 13B or 13C, with the exception of the single brushes which form the remaining parts of large brushes S6A, S6B and S6C and which are connected electrically to the single brushes, designated by the same reference symbols, of the cell of Graetz bridge 13A.

It will be noted that in order to conform strictly to the diagram of FIG. 4, the single brushes of the cells of Graetz bridges 13A, 13B and 13C should in fact be constituted by double brushes, the outer brushes of which would be connected electrically to the inner brushes and would be in contact with the inner peripheral surface of hollow conductor elements 9A, 9B and 9C respectively. However, double brushes may be dispensed with and single brushes as described above used instead by setting up electrical connections between brushes S1A and S6A, S1B and S6B, and S1C and S6C, respectively. In the diagram of FIG. 4, this means elimination of conductive pads 24, 25 and 26 and establishment of the abovementioned electrical connections between brushes S1A and S6A, S1B and S6B, and S1C and S6C. Similarly, it will be noted in the diagram of FIG. 4, small brushes S1A, S1B and S1C and conductive pads 24, 25 and 26 may be eliminated and that, in this case, conductive pads 27 and 28, 29 and 30, and 31 and 32 may be shifted one step toward the left into positions represented by the broken line, so that, in position j, the three large brushes S6A, S6B and S6C are respectively in contact with pairs of conductive pads 27 and 28, 29 and 30, and 31 and 32. In this case, the double brushes represented in FIGS. 7 and 8 may be replaced with single brushes having only one inner brush, while the single brushes of FIGS. 7 and 8 may be replaced with double brushes, the outer brushes of which enable establishment of electrical contacts between conductive pads 7A and 9A, 7B and 9B, and 7C and 9C in position j of brushes S6A, S6B and S6C. It is thus clear that the arrangement of brushes represented in FIGS. 7 and 8 is not the sole one and that other arrangements may be foreseen without departing from the framework of the invention.

As is more especially visible in FIGS. 5 and 8, the brush outputs pass through slots 33 provided in the outer peripheral surface of the hollow conductor elements which form the second, or outer, ring of the cells and extend circumferentially over a predetermined angle. The brush outputs are affixed mechanically to rings 34. Rings 34 are made preferably of an insulating material but they may also be made of conducting material provided that the brush outputs are insulated with respect to the rings. The above-mentioned electrical connections between the brushes of adjacent cells may be carried out in an appropriate way at rings 34. Rings 34 enable simultaneous operation of the brushes corresponding to the three output phases. To this end, any one of rings 34 may be connected mechanically to an appropriate control mechanism (not shown) enabling the set of rings 34 to be turned around the longitudinal axis of the cells.

With the arrangement of brushes represented in FIGS. 7 and 8, conductive pads 27 to 32 represented in FIG. 4 are formed on the inner peripheral surfaces of the hollow conductor elements forming the second, or outer, ring of the cells, while the other conductive pads represented in FIG. 4 (with the exception of pads 24 to 26 which may be omitted if brushes S1A, S1B and S1c are connected electrically to brushes S6A, S6B and S6C respectively) are formed on the outer peripheral surfaces of the hollow conductor elements forming the first, or intermediate, ring of the cells. The conductive pads intended to cooperate with brushes S6A, S2A, S2B, S2C and S1A are placed in appropriate angular positions g, h, i and j in an arrangement analogous to that shown in FIG. 4, with the difference that with brushes S1A and S2A disposed back to back, the pair of pads 27 and 28 (7A, 9A) of FIG. 4 will be disposed facing pad pair 1A, 4A. The conductive pads intended to cooperate with brushes S6B, S3A, S3B, S3C and S1B are disposed similarly in angular positions shifted 120° with respect to the preceding conductive pads. In the same way, the conductive pads intended to cooperate with brushes S6C, S4A, S4B, S4C and S1C are disposed similarly in angular positions shifted 240° with respect to the first-mentioned pads. The conductive pads may be formed on the inner and outer peripheral surfaces of the hollow conductor elements in any appropriate manner. For example, an insulating coating may be formed or deposited on these surfaces using an appropriate mask so that areas of these surfaces remain exposed at the spots desired for conductive pads. A coating of conductive material may possibly be formed or deposited on the above-mentioned exposed areas. Inversely, the parts of the inner or outer peripheral surfaces of the hollow conductor elements which do not correspond to the desired conductive pads may be hollowed out, e.g. by chemical means, so that the conductive pads appear in relief, and an insulating coating may be formed or deposited in the hollowed parts.

As shown in FIG. 5, the cells are electrically insulated from each other by joints 35 of insulating material which effect by construction the separation of conductors 7A and 9A, 1A and 4A, 2A and 5A, etc., of FIG. 3. In consequence, central hollow conductor elements 8A, 10A, 8B, 10B, 8C and 10C must all be connected together electrically by an appropriate electrical connection so as to form neutral point 15 of FIG. 3. As a variant, the above-mentioned central hollow conductor elements may be constituted by a single central hollow conductor element having a length substantially equal to the total axial length of the six cells. The six cells are further held together mechanically by means of an axial clamping device comprising, e.g. two end flaps (not shown) connected by an axial brace 36 passing through the center of the central hollow conductor element(s).

The static frequency converter shown in FIG. 5 is cooled by a cooling fluid, preferably a neutral or reducing liquid, circulating axially within the hollow conductor elements and the annular spaces formed between these latter. To this end, the above-mentioned end flaps may be set up so as to form input and output collection chambers for the cooling liquid. The cooling liquid also circulates in chambers 23 (FIGS. 7 and 8) so as to cool the brushes, which are crossed during operation by the current of the Graetz bridges. In order to ensure effective cooling of the brushes, the latter are preferably constituted by conductive metallic pile brushes. In addition, in order to avoid having the cooling liquid circulating axially in chambers 23 primarily in those areas not occupied by brushes, without passing over the conductive pile of the latter, means are provided for creating a circulation of cooling liquid in the circumferential direction in chambers 23. To this end, as is shown in FIGS. 5 and 8, each chamber 23 is sealed at its two axial extremities by walls 37 and 38, which are of a piece with the outer hollow conductor elements of the cells, and communicates through orifices 39, formed in its longitudinal walls, with axial channels 40 and 41 which are also formed in the outer hollow conductor elements of the cells. Walls 37 and 38 may also be formed by joints 35. Channels 40 are open at one extremity, e.g. the side of end wall 37, as shown in FIG. 5, and are closed at their other extremity. Similarly, channels 41 are open at one end, on the side of end wall 38, and closed at the opposite end. Thus, if FIG. 7 is taken as an example and it is supposed that channels 40 are the entry channels for the cooling fluid, the latter will penetrate through orifices 39 into chambers 23, circulate circumferentially within said chambers, passing across the conductive pile of the brushes, and will then pass through orifices 39 and enter channels 41 which serve as exit channels. However, it will be noted that to facilitate passage of the cooling liquid from the exit channel of a cell to the entry channel of the next cell, the respective positions of the entry and exit channels of the following cell should be exchanged with respect to the respective positions of the entry and exit channels of the preceding cell so that the entry channels of the following cells are aligned with the exit channels of the preceding cell. Of course, insulating joints 35 must be cut in an appropriate way to allow the cooling liquid to pass from one cell to another. Finally, in order to limit cooling liquid leaks to the outside through slots 33, each slot 33 is preferably provided with an elastomer joint 42 in the shape of a buttonhole with overlapping flexible lips.

The static frequency converter represented in FIG. 5 may be housed in a sealed enclosure (not shown) which is itself traversed by the cooling liquid.

The concrete embodiment of the static frequency converter which has been described with reference to FIGS. 5 to 8 is particularly convenient since the outer hollow conductor elements of the cells lend themselves very well to the fitting out of chambers 23 for brushes without compromising the cooling of the thyristors and of the hollow conductor elements themselves. In addition, this form of embodiment is particularly advantageous to the extent that it enables obtainment of a polyvalent static frequency converter, i.e. one capable of functioning as a natural commutation cycloconverter or as a natural commutation rectifier-inverter, with very small overall size.

It is understood that the invention is not limited to the embodiments which have been particularly described above but that numerous variants may be foreseen without departing from the framework of the present invention. For example, the multipoint switch of FIG. 4 may include one or more additional positions enabling obtainment of any one of rectifier-inverters A, B and C of FIG. 3, or an additional position enabling connection in parallel of the outputs of the three rectifier-inverters A, B and C of FIG. 3. In addition, although the invention has been described above with particular reference to a three-phase cycloconverter transformable into three three-phase rectifier-inverters, it follows naturally that the invention is equally applicable to a static frequency converter comprising a greater or lesser number of phases.

Obviously, numerous additional modifications and variations of the present invention are possible in light of the above teachings. It is therefore to be understood that within the scope of the appended Claims, the invention may be practiced otherwise than as specifically described herein.

What is claimed as new and desired to be secured by Letters Patent of the United States is:

1. A natural commutation static frequency converter intended particularly for supplying a synchronous motor, comprising:
    a polyphase cycloconverter having a control circuit, said polyphase cycloconverter comprising n monophase cycloconverters each having two reversed Graetz bridges, said Graetz bridges having inputs interconnected and a pair of outputs also interconnected, one of the outputs of each monophase cycloconverter being connected to a neutral point;
    at least one self-inductance connected in series between the other output of said Graetz bridges of each monophase converter;
    at least one natural commutation rectifier-inverter control circuit; and
    commutation switching means for enabling breaking of the connections between the inputs to the two Graetz bridges of at least one of monophase cycloconverters, as well as of the outputs of said bridges which are not connected to the neutral point such that said self-inductance is inserted between the opened Graetz bridge outputs not connected to said neutral point, said commutation switching means resulting in replacement of the cycloconverter control circuit with said natural commutation rectifier-inverter control circuit so as to form at least one natural commutation rectifier-inverter, said commutation switching means further enabling replacement of Graetz bridge outputs not connected to said neutral point of the polyphase converter with outputs of at least one rectifier-inverter so formed.

2. A static frequency converter according to claim 1, further comprising:
    said polyphase cycloconverter comprising three monophase converters; and
    said commutation switching means forming from the three monophase cycloconverters at least one pair of rectifier-inverters having outputs which are connected in parallel.

3. A static frequency converter according to claim 2, further comprising:
    said commutation switching means comprising a multipoint switch enabling selective realization of the polyphase cycloconverter and of any one of the three possible pairs of rectifier-inverters from the three monophase cycloconverters.

4. A static frequency converter according to claims 2 or 3, further comprising:
    conductors connected to each of the controlled semiconductors forming each Graetz bridge, said conductors comprising multi-tubular, hollow elements traversed by a cooling fluid, including a central hollow element, three hollow elements insulated from each other and disposed circumferentially so as to form a first ring around the central hollow element, and three other hollow elements electrically interconnected and disposed circumferentially so as to form a second ring around the first, the controlled semiconductor elements being placed in the spaces between the central hollow element and the first ring and between the latter and the second ring;
    conductive contact pads provided on the walls of the multi-tubular hollow elements forming the first and second rings; and
    said commutation switching means comprising a set of movable brushes making contact with said walls and establishing electrical contacts with selected conductive pads.

5. A static frequency converter according to claim 4, further comprising:
    chambers for housing said set of movable brushes, said chambers provided in the hollow elements forming said second ring and opening to the inside in the direction of the outer peripheral wall of the hollow elements making up the first said ring.

6. A static frequency converter according to claim 5, further comprising:
   said set of movable brushes comprising conductive pile brushes; and
   the cooling fluid being a liquid.

7. A static frequency converter according to claim 6, further comprising:
   means for creating a circulation of cooling fluid over the brushes.

8. A static frequency converter according to claim 7, further comprising:
   said circulation means comprising means for creating a circulation of the cooling liquid in the circumferential direction within said chambers.

* * * * *